PARAMAGNETIC BOARDS AND ATTACHMENTS

Filed Jan. 18, 1965 5 Sheets-Sheet 1

INVENTORS:
DOROTHEA J. STINN
JACK P. BURKE
TED C. SKONBERG
BY Head & Johnson
ATTORNEYS

PARAMAGNETIC BOARDS AND ATTACHMENTS

Filed Jan. 18, 1965 5 Sheets-Sheet 2

INVENTORS:
DOROTHEA J. STINN
JACK P. BURKE
TED C. SKONBERG

BY Head & Johnson
ATTORNEYS

PARAMAGNETIC BOARDS AND ATTACHMENTS

Filed Jan. 18, 1965 5 Sheets-Sheet 3

INVENTORS:
DOROTHEA J. STINN
JACK P. BURKE
TED C. SKONBERG

BY Head & Johnson

ATTORNEYS

*INVENTORS:*
DOROTHEA J. STINN
JACK P. BURKE
TED C. SKONBERG
BY Head & Johnson
ATTORNEYS

PARAMAGNETIC BOARDS AND ATTACHMENTS

Filed Jan. 18, 1965 5 Sheets-Sheet 5

INVENTORS:
DOROTHEA J. STINN
JACK P. BURKE
TED C. SKONBERG
BY Head & Johnson
ATTORNEYS 3,339,297
PARAMAGNETIC BOARDS AND ATTACHMENTS
Dorothea J. Stinn, 409 Indigo Drive, Prospect Heights, Ill. 60070; and Jack P. Burke, 6078 Newberg Ave.; and Ted C. Skonberg, 6941 N. Ozark Ave.; both of Chicago, Ill. 60631
Filed Jan. 18, 1965, Ser. No. 426,339
3 Claims. (Cl. 35—73)

This invention relates to a visual education device. More specifically, this invention relates to an educational device for use in dramatizing various scientific concepts by the arrangement of component parts.

The main purpose of this invention is to provide a means by which an instructor may demonstrate the subject he is teaching in an efficient and vivid manner.

Essentially, the invention functions as a method of displaying various artistic, mathematical and scientific concepts by the magnetic adhesion of various objects which might be called symbolic elements to a two-sided, steel-backed blackboard.

Further objects and advantages of the invention will become apparent from the following description and claims, and from the accompanying drawings in which:

FIGURES 20 to 25 demonstrate use of some of the magnetic components to represent atomic and molecular structures.

Figures 26, 27, 28:
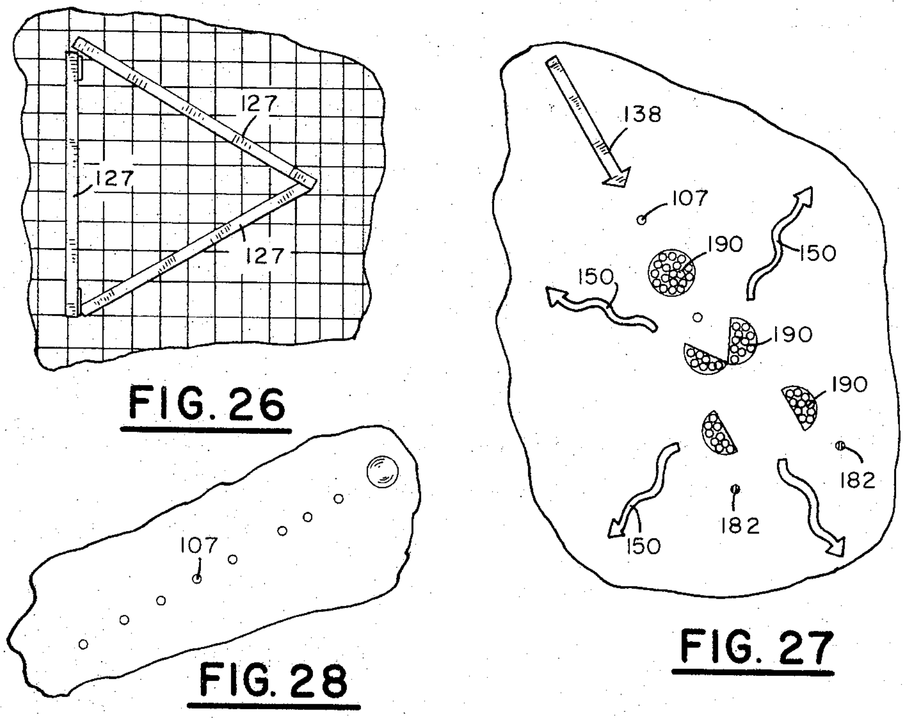

FIGURE 26 shows the use of the magnetic rods to represent geometric figures.

FIGURE 27 shows the use of various components to represent atomic fission.

Figure 29:
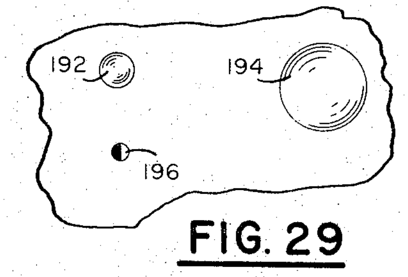

FIGURES 28 and 29 show components of the invention representing solar bodies.

Figures 30, 31, 32:
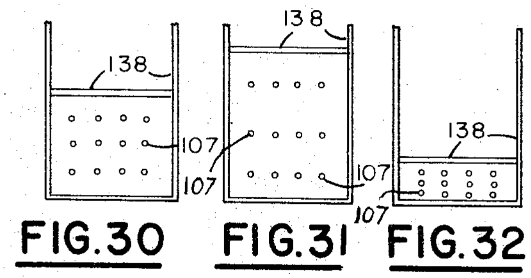

FIGURES 30 to 32 show the invention used in representing the compression of gases.

Figure 33:
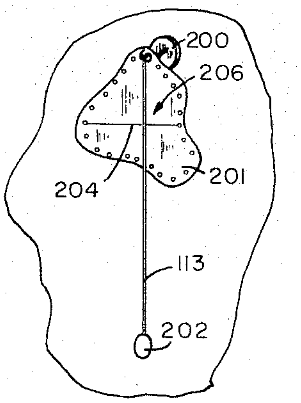

FIGURE 33 shows how components of the invention may be used to demonstrate center of gravity.

Figure 34:
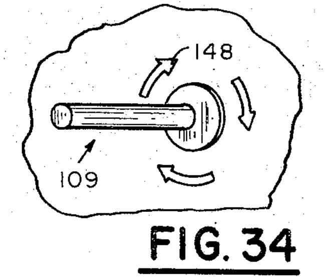

FIGURE 34 demonstrates the magnetic field around a wire through which current is flowing.

For mathematics, it is possible to show the principles of graphs, vectors, trigonometric functions and set theory easily and quickly and in a manner which students find interesting and attractive.

Figures 1, 2, 3, 4, 5, 6, 7, 8, 9:
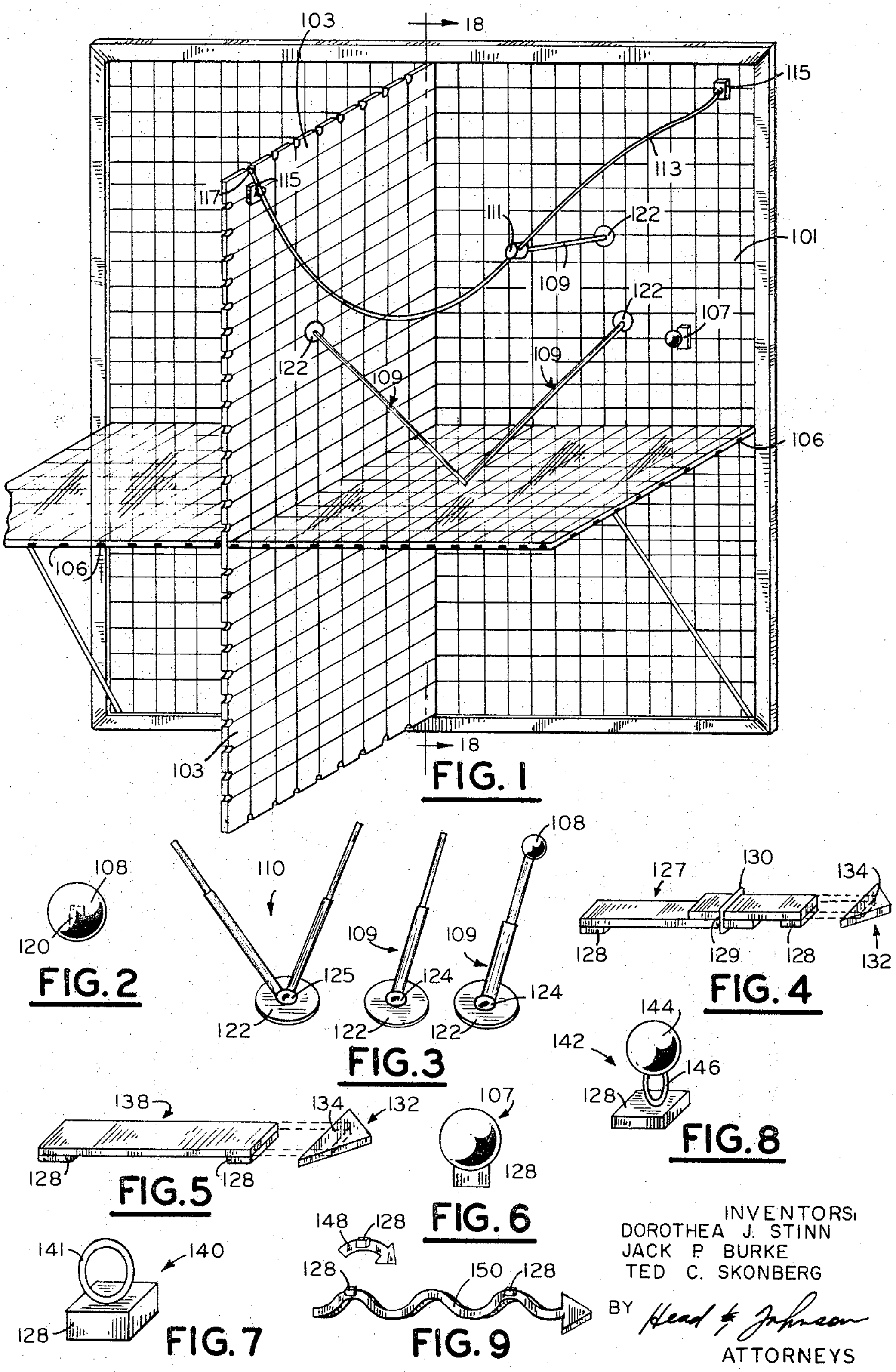
FIGURE 1 is a perspective view of various components of the invention and demonstrates the use of certain parts of the invention to portray an equation in space.
FIGURES 2 to 9 show sectional views of various components of the invention and details of their construction.
Figure 18:
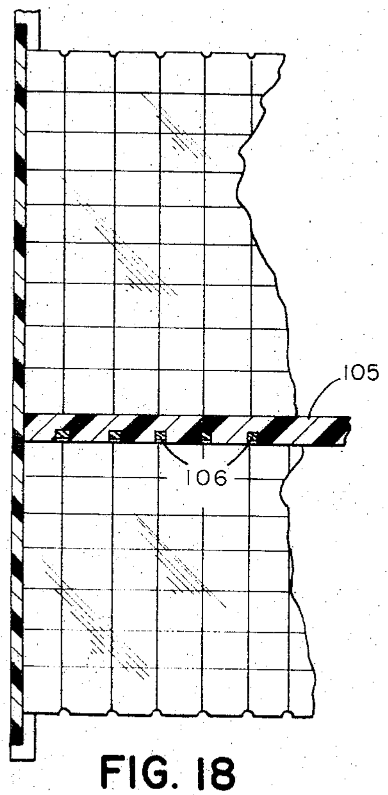
FIGURE 18 is a sectional view through the section 18—18 of FIGURE 1.

In FIGURE 1, blackboard 101 is the basic unit of this invention. Blackboard 101 is formed of two sheets of blackboard material which are joined to a piece of sheet steel placed between each of them. This blackboard material may be paper, cardboard, wood, plastic, or any similar material which is capable of being written upon by chalk or crayon and which at the same time is non-magnetic. One side of the blackboard, shown here as the front side of the $x$–$y$ plane, is ruled graphically. The reverse side of the $x$–$y$ plane is unruled. The basic blackboard 101 is designed to be free standing by means of leg extensions or a tripod support. A vertical blackboard leaf 103 is constructed similarly to blackboard 101 but ruled graphically on both sides. This vertical leaf 103 may be removably attached to blackboard 101 to represent the $y$–$z$ plane. A transparent, graph-lined sheet of transparent plastic 105, such as Plexiglas, is removably attached to both blackboard 101 and blackboard leaf 103 and represents the $x$–$z$ plane. FIGURE 18 is a cross-sectional view of the blackboard and transparent plastic sheet through the plane indicated, and discloses how the metal strips 106 are embedded in the underneath side of the plastic sheet to permit attraction of the magnets. In place of the transparent plastic sheet 105, a sheet of blackboard material similar to blackboard 101 may be used. A magnetic plastic ball 107 may be used as shown to demonstrate the plotting of coordinate points. An extensible magnetic swivel rod 109 may be fitted with a removable eyelet 111 through which a plastic cord 113 which may be brightly colored may be passed to indicate an equation in space. The end of this plastic cord 113 may be held in place by either a magnetic spring clip 115 affixed to the blackboard or by common spring clips 117 fixed to the edge of the board.

FIGURE 1 also shows how two extensible swivel rods 109 may be used to demonstrate either a line in space or a plane in space. In FIGURE 1, one of these swivel rods 109 may be magnetically attached to a point in the $x$–$y$ plane and the other swivel rod 109 to a point on the $y$–$z$ plane. These rods are then extended to meet at a point in the $x$–$z$ plane.

FIGURES 2 through 9 are sectional views of various components of this invention to show the preferred structure of each. FIGURE 2 represents a plastic ball 108 which may be positioned on the end of the extensible swivel rods 109 or 110 to indicate points in space.

FIGURE 3 shows the construction of the magnetic, extensible swivel rod 109 with the plastic ball 108 of FIGURE 2 in position. The single swivel base 124 and the double swivel base 125 (both shown generally by the numeral 122) may be constructed so that the swivel rods 109 and 110 are removable.

FIGURE 4 shows the magnetic, extensible flat rods generally indicated by the numeral 127 and the means of attachment to the magnets 128. The clip 130 which holds and locks the rods in position moves in the groove 129. The arrowhead 132 is held in position by the clip 134.

Figure 19:
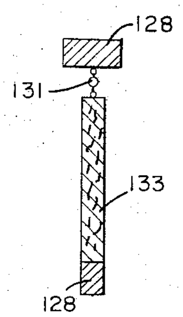
FIGURE 19 is a top elevational view of another form of magnetic rod.
Figure 20:
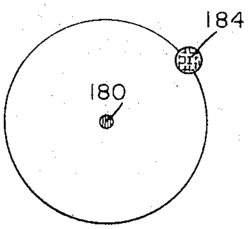

FIGURE 5 shows the magnetic flat rods 138 of fixed length. As in FIGURE 4, the magnets 128 and the arrowheads 132 are shown in this exploded view. The magnets 128 are rigidly attached and the polarity of these magnets may be oriented in any chosen direction prior to attachment. FIGURE 19 shows an alternate form of rod 133 in which one magnet 128 is rigidly in place and another magnet 128 is connected to the rod by a swivel 131. Of course, a variation of this form of rod would be one in which a swivel 131 and magnet 128 are attached at both ends of the rod.

FIGURE 6 shows the construction of a magnetic plastic sphere 107. Magnet 128 is shown in position.

FIGURE 7 shows the magnetic ring 140 wherein the plastic cord may be passed through ring 141 and magnet 128 holds the ring in position.

FIGURE 8 shows a magnetic sphere with a ring attached. Magnetic sphere 142 is comprised of plastic sphere 144 and ring portion 146 and magnet 128 in one suggested relationship.

FIGURE 9 shows two forms of magnetic arrows. An arrow with a single arc 148 is used to show the flow of the magnetic field around a wire positioned by magnet 128 as shown in FIGURE 34. An arrow 150 having multiple curves is used to show the release of energy in an atomic reaction. As with the arrow of single curvature, magnets 128 are shown in position.

To demonstrate either linear or non-linear equations, a number of magnetic rings 140 may be placed at the desired number of points and the brightly colored plastic cord 113 passed through the rings to outline the line of the equation. This is shown in FIGURE 10 where the graph of an equation on the $x$–$y$ plane is shown by use of the plastic cord 113.

The invention is not limited to a demonstration of mathematical functions in two-dimensions. By means of the graphically ruled steel-based blackboard leaf 101, the vertical leaf 103 and the transparent plastic leaf 105, it is possible to plot coordinate points and show the lines of equations in space.

To show the point (3, 5, 4), place an extensible rod 109 at the point (3, 5) on the $x$–$y$ plane and extend the rod four units in the $z$-direction parallel to the $y$–$z$ and $x$–$z$ planes. A plastic ball 108 placed at the end of the rod shows the position of the point in space as indicated by FIGURE 10. Of course, at the same time the swivel rod 109 itself demonstrates the linear equation $z=k$.

Figure 10:
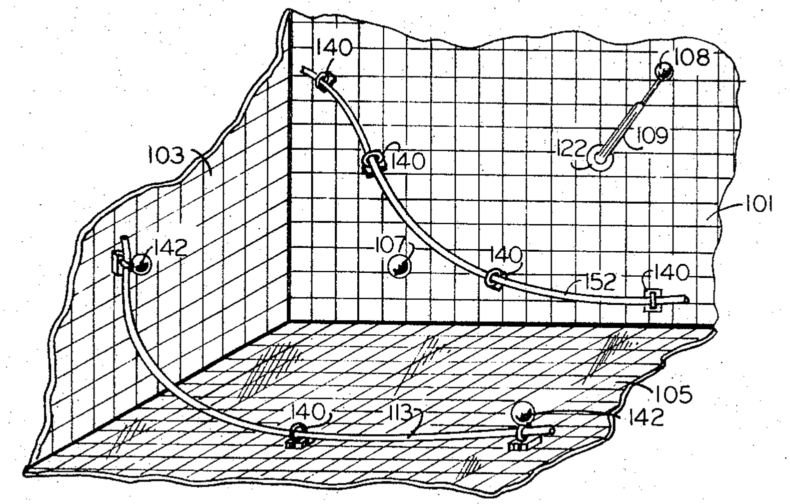
FIGURE 10 is another perspective view of the blackboard portions and shows use of various components.

Also, FIGURE 10 shows the use of the plastic magnetic spheres with rings 142 and magnetic rings 140 to show non-linear equations in space. In this instance the plastic magnetic spheres are used to indicate points at the end of the portion of the equation 152 shown and the magnetic ring is used to hold the plastic cord 113 in place along the $x$–$z$ plane. Vectors can be shown easily by means of the extensible, magnetically affixed, arrow-shaped rods 127 which can be quickly and easily adjusted and affixed to the board to indicate the desired magnitude and direction of forces at a point.

Figure 11:
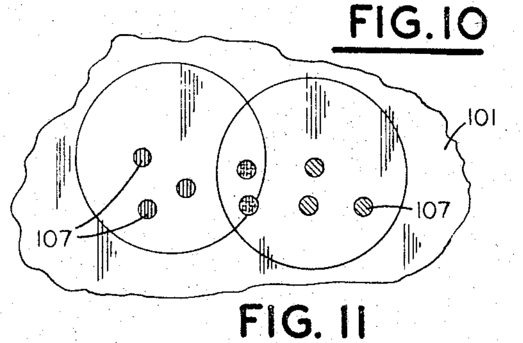
FIGURE 11 is a Venn diagram to demonstrate use of sets.

The concepts of sets are easily demonstrated by the appropriate use of the magnetic plastic balls 107. Venn diagrams may be drawn on the board and the plastic balls of various colors placed in the proper areas, as in FIGURE 11. Three red balls are shown as belonging entirely to one circle, three green balls as belonging entirely to the second circle, and two yellow balls are shown as being common to both circles.

Figure 14:
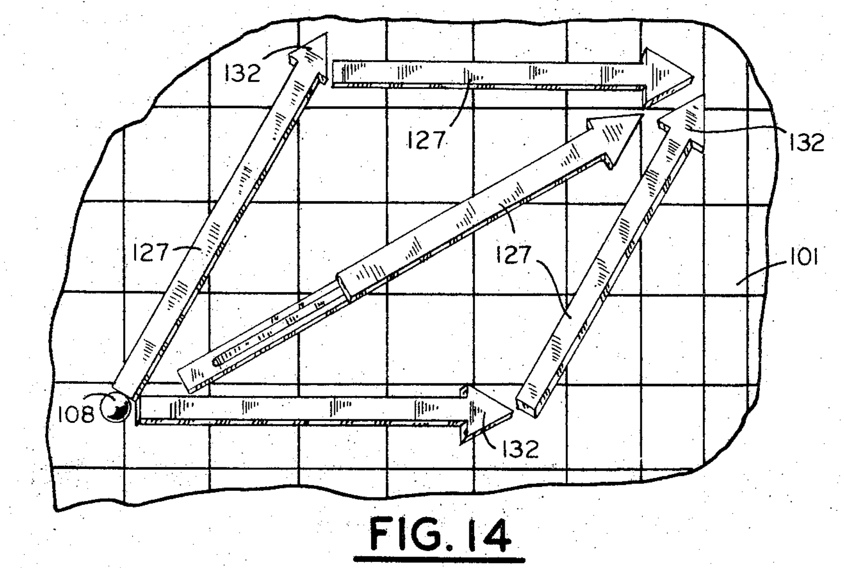
FIGURE 14 shows the use of the extensible rods with arrows attached to demonstrate the vector forces.

Geometric figures of various types can be shown by means of magnetically fixed extensible rods 127 as, for example, the demonstration of vector forces in FIGURE 14 with arrowheads 132 attached. Similarly, FIGURE 26 demonstrates another geometric figure with rods 127 without the arrowheads.

Figures 12, 13:
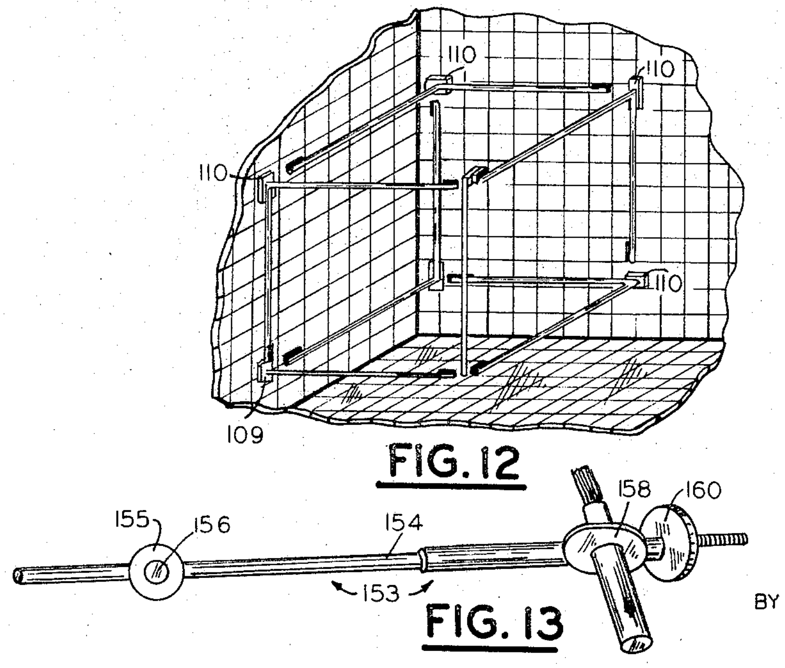
FIGURE 12 is a perspective view of a portion of the invention showing the use of the extensible swivel rod and a magnetic rod to define a cubical figure.
FIGURE 13 shows details of the magnetic compass component.

Some solid figures can be shown by appropriate disposition of the magnetic extensible swivel rod 109, as shown in FIGURE 12. For example, to show a cube which is five units on a side, place a number of extensible swivel rods, rabbit ear type 110 and single rod type 109, at the points shown in FIGURE 12 and extend each rod to the equivalent of five units. Then, to designate that side of the cube which is formed in space, suspend a portion of plastic cord 113 from the point of juncture of the upper rods to the point of juncture of the lower rods. It should be noted that to demonstrate a cubical form, the use made of five rabbit ear type swiveled rods and one single extensible rod should be evidence that this configuration may be varied to represent other types of solids, such as parallelepipeds.

One component of the invention is a magnetic circle maker 153, or compass, as shown in FIGURE 13, which consists of an extensible rod 154 which is free to turn about a magnetic swivel or magnetically affixed center

155. The rod 154 is inserted into the swivel opening 156. Chalk 157 is inserted into the chalk holder 158 beyond the circumference of a circle to be drawn. A magnetic wheel 160 holds to the board but turns easily. A circle far superior to that drawn by the ordinary blackboard compass may be drawn very quickly in a single motion.

Figure 15:
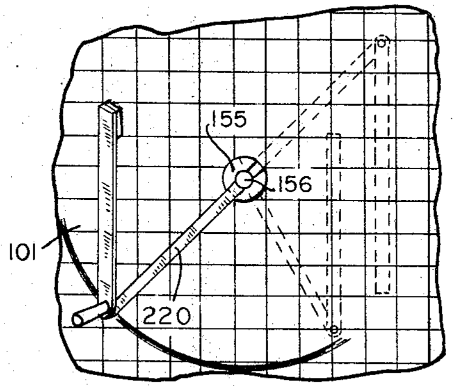
FIGURE 15 shows the jointed magnetic swivel rods in use.

FIGURE 15 describes how various trigonometric functions may be explained by employing the jointed magnetic rotating rod 220. FIGURE 15 shows the jointed magnetic rotating rod 220 in one fixed position, and also as it would appear if rotated around this fixed position.

Figures 16, 17:
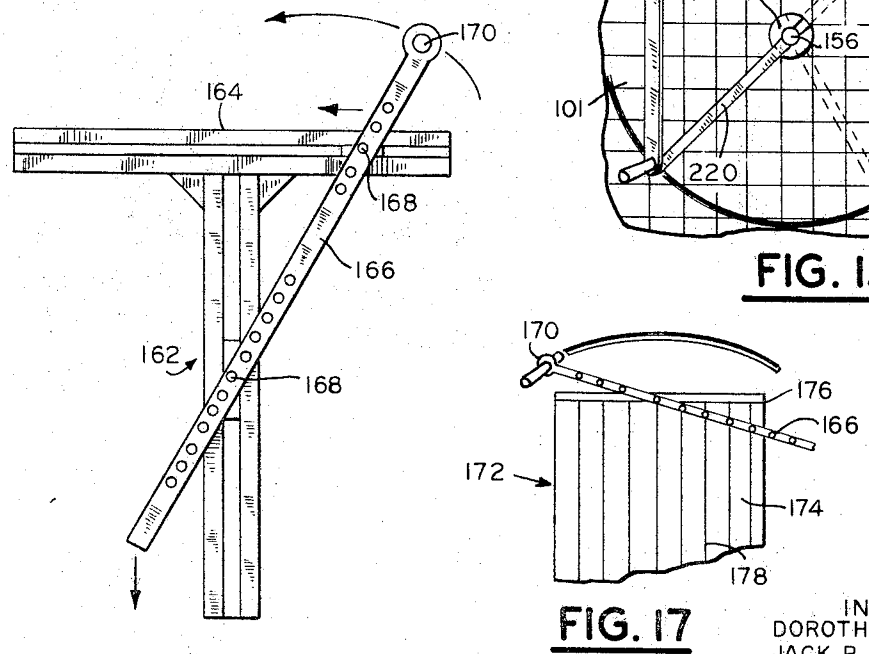
FIGURE 16 is a top view of the ellipse maker component.
FIGURE 17 is a perspective view of another species of ellipse maker.

The invention also has a ellipse maker shown generally by the numeral 162 in FIGURE 16. The ellipse maker 162 consists of a grooved, T-shaped magnetically affixed plastic form consisting of a horizontal, T-portion 164, a vertical shaft portion 165, and a movable plastic rod 166 with two removable screws 168 that extend through to the grooves of the T-shaped rod. The plastic rod 166 has an opening at one end, shown as chalk holder 170, for the insertion of a piece of chalk. The screw which is closest to the chalk determines the minor axis of the ellipse and the screw farther removed determines the major axis. As the chalk holder is moved to draw one portion of the ellipse, the first mentioned screw moves horizontally along the T-portion 164 and the second mentioned screw moves vertically along the shaft 165. The T-portion 164 is constructed so that is will move slidably horizontally while the shaft 165 remains stationary. Of course, the ellipse maker described in FIGURE 16 will permit only one-half an ellipse to be drawn while the ellipse maker is at one particular position. To complete the ellipse, the ellipse maker must be removed from the blackboard, rotated 180° and replaced in the opposite position. A subsequent movement of the chalk will draw the other half of the ellipse. Alternate construction of the ellipse attachment is shown in FIGURE 17 as 172 generally in which the T of FIGURE 16 is replaced by a grooved rectangular block 174 which has a horizontal groove 176 and a series of vertical grooves 178. As in the embodiment of FIGURE 16, the screw or peg moving along the horizontal groove 176 determines the minor axis of the ellipse while the screw moving along the vertical groove 178 determines the major axis. This species also will draw only one-half of an ellipse when the unit is in one particular position and as in the other species this unit must be rotated 180° in order to complete the ellipse.

Figure 21:
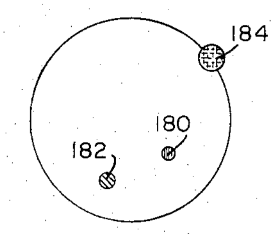
Figure 22:
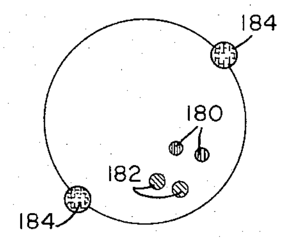
Figure 23:
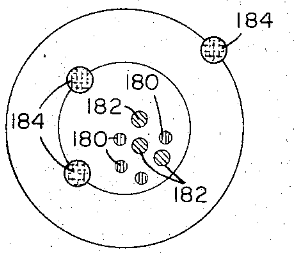
Figure 24:
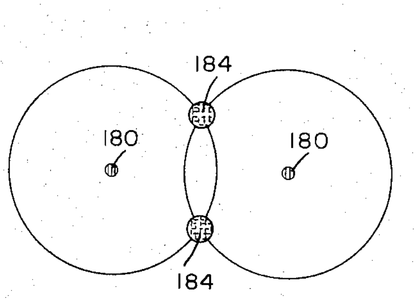
Figure 25:
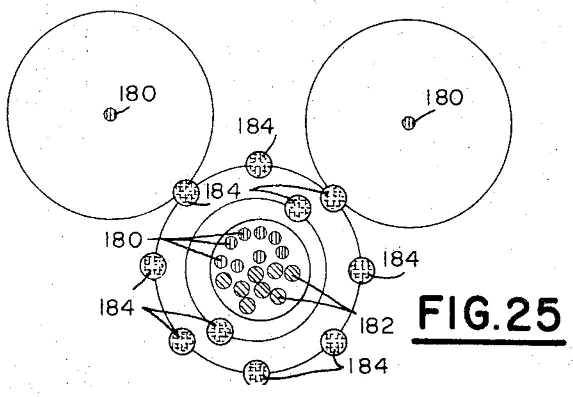

Demonstrations of many concepts of the physical sciences are possible with the invention. Atomic structure is easily shown by affixing magnetic plastic balls 107 of various colors and sizes to the board. For example, a small red ball could be used as a proton and a small green ball a neutron. A large gold bead could be an electron. Circles 186 may be drawn with a compass of FIGURE 13 to represent the various electron orbits. The hydrogen atom (see FIGURE 20) could be represented by having a red ball represent a proton as the nucleus and a gold bead represent the single electron in its orbital path. FIGURE 21 represents the heavy hydrogen atom. Since the helium nucleus contains two protons and two neutrons, these could be represented by two red balls 180 and two green balls 182 as shown in FIGURE 22. FIGURE 23 represents a lithium atom. The three protons in the lithium nucleus are shown by three red balls 180, and the four neutrons in the nucleus are shown by four green balls 182. FIGURE 24 represents the formation of a hydrogen molecule by presenting two hydrogen atoms in adjacent positions. In a similar manner, FIGURE 25 represents a water molecule by presenting an oxygen atom and two hydrogen atoms in close proximity. It can readily be seen that the various isotopes of atoms can be shown by the easy insertion into, or removal from, the nucleus of the atom on one or more of the green balls. Valence may be indicated by the addition to or removal from the atom of the requisite number of gold balls representing electrons.

Molecules may be shown by the use of a multiplicity of the atomic structures.

Atomic fission could be shown by means of discs to which the plastic balls of different colors have been attached to represent the protons and neutrons in a nucleus. A flat rod, of either fixed length 138 or extensible 127, with arrowhead 132 attached, could indicate the path of a high energy particle about to strike the nucleus, as shown in FIGURE 27 in which the destruction of the nucleus is shown in sequence. The particle is shown about to strike the nucleus represented by two semi-circular discs 190 holding the required number of electrons. The wavy arrows 150 indicate the release of energy, and, finally, the nucleus is split and two neutrons 182 are released.

The structure of the solar system could be demonstrated by the appropriate distribution of various sized plastic balls to represent the planets and the larger plastic ball or hemisphere to represent the sun. It is possible by a proper choice of plastic balls to indicate roughly the relative spacing of the planets and their orbits as shown in FIGURE 28. Phases of the moon could be shown as in FIGURE 29 by using a large hemisphere or plastic ball to represent the sum 194, a smaller one to represent the earth 192, and a still smaller sphere which is light on one side and dark on the other to represent the moon 196. By placing the moon at the proper position relative to the sun and earth, the various phases of the moon could be demonstrated. And it is possible to show the shadow produced during an eclipse by setting a hemisphere representing the earth and a plastic ball for the moon on the board and using light from a flashlight to represent the light of the sun. By placing the ball between the flashlight and the hemisphere, a shadow is produced such as is produced during a solar eclipse. A lunar eclipse can be produced in a similar manner by placing the hemisphere between the flashlight or source of light and the plastic ball representing the moon.

FIGURES 30 to 32 exemplify the action and distribution of molecules in the relationship between the pressure and volume of a gas. The confining vessel for the gas and a movable piston are represented by means of the magnetic rods of fixed length 138 as shown. The piston is arranged so that it may be moved up and down. Plastic balls 107 represent the gas molecules. The movement of the piston corresponds to the alternate increase or decrease in pressure, and the resulting compression or rarefaction of the gas can be clearly seen at the molecular level.

The determination of the center of gravity of an irregularly shaped object is shown in FIGURE 23. A magnetic hook 200 is placed on the blackboard 101 and a piece of plastic cord 113 having a weight 202 at one end is looped over the magnetic hook. The irregularly shaped object 201 is affixed to the magnetic hook by inserting the hook through one of the series of holes around the edge of the object. The path of the plastic cord across the irregular object is then drawn as indicated by line 204. The plastic piece is then removed and placed over the magnetic hook through another one of the holes. The second path of the plastic cord across the object is then drawn as shown. The point 206 at which the two lines intersect is the center of gravity.

Since many widely different embodiments of this invention may be made without departing from the spirit and scope thereof, it is to be understood that the specific embodiments described in detail herein are not to be taken in a limiting sense, since the scope of this invention is best defined by the appended claims.

What is claimed:

1. An educational device comprising:
   a self-supported first blackboard panel wherein said panel consists of a metallic sheet secured between two sheets of blackboard material,
   a second blackboard panel consisting of a metallic sheet secured between two sheets of blackboard material, removably vertically attached to said first panel in a right angular position,
   a third panel consisting of a transparent plastic sheet in which metallic strips are embedded, removably horizontally attached to said first panel and said second panel in a right angular position to said first and second panels, and
   one or more symbolic elements magnetically attachable to said panels to represent various scientific concepts.

2. An educational device as set forth in claim 1 in which one or more of said symbolic elements comprises
   a compass consisting of an extensible rod which is free to turn upon a magnetic swivel, a magnetic wheel, and a chalk holder.

3. An educational device as set forth in claim 1 in which one or more of said symbolic elements comprises
   an ellipse maker which consists of a grooved, T-shaped form magnetically attachable to said panel, a movable plastic rod attachable to said T-shaped form by removable screws, and which said movable plastic rod has an opening at one end for holding a piece of chalk.

References Cited

UNITED STATES PATENTS

| | | | |
|---|---|---|---|
| 1,912,380 | 6/1933 | McCully | 35—34 |
| 2,424,286 | 7/1947 | Robbins | 33—27 X |
| 2,518,204 | 8/1950 | Victor | 40—142 |
| 2,668,370 | 2/1954 | Trimble | 35—7 |
| 2,781,582 | 2/1957 | Wursch | 33—27 |
| 2,921,388 | 1/1960 | Stefaney | 35—73 |
| 2,996,804 | 8/1961 | Hancox | 35—31 |
| 3,028,686 | 4/1962 | Frisch | 35—34 |
| 3,111,761 | 11/1963 | McAlister | 35—27 |

FOREIGN PATENTS

| | | |
|---|---|---|
| 866,253 | 2/1953 | Germany. |

EUGENE R. CAPOZIO, *Primary Examiner.*

H. S. SKOGQUIST, *Assistant Examiner.*